(12) United States Patent
Trofimuk et al.

(10) Patent No.: US 9,205,370 B2
(45) Date of Patent: Dec. 8, 2015

(54) PROCESS FOR RECOVERY OF PROCESSING LIQUIDS

(75) Inventors: Terrance Trofimuk, Calgary (CA); Steven Ayres, Calgary (CA); Shaun M. Hill, Calgary (CA); Raymond G.F. Abry, Calgary (CA)

(73) Assignee: CCR Technologies, Ltd., Calgary, Alberta (CA)

(*) Notice: Subject to any disclaimer, the term of this patent is extended or adjusted under 35 U.S.C. 154(b) by 287 days.

(21) Appl. No.: 13/818,278

(22) PCT Filed: Aug. 23, 2011

(86) PCT No.: PCT/IB2011/002686
§ 371 (c)(1),
(2), (4) Date: Apr. 16, 2013

(87) PCT Pub. No.: WO2012/032410
PCT Pub. Date: Mar. 15, 2012

(65) Prior Publication Data
US 2013/0192465 A1    Aug. 1, 2013

Related U.S. Application Data

(60) Provisional application No. 61/376,431, filed on Aug. 24, 2010.

(51) Int. Cl.
*B01D 53/14* (2006.01)
*B01D 19/00* (2006.01)

(52) U.S. Cl.
CPC ........ *B01D 53/1425* (2013.01); *B01D 19/0036* (2013.01); *B01D 53/1475* (2013.01); *Y02C 10/04* (2013.01); *Y02C 10/06* (2013.01)

(58) Field of Classification Search
None
See application file for complete search history.

(56) References Cited

U.S. PATENT DOCUMENTS 3,725,529 A * 4/1973 Giammarco et al. ......... 423/223
3,823,222 A * 7/1974 Benson
(Continued)

FOREIGN PATENT DOCUMENTS

| CA | 2632425 | 7/2007 |
| FR | 2916652 | 5/2008 |
| GB | 2074035 | 10/1981 |

*Primary Examiner* — Duane Smith
*Assistant Examiner* — Phillip Shao
(74) *Attorney, Agent, or Firm* — Bushman Werner, P.C.

(57) ABSTRACT

A process for recovering a processing liquid used in gas purification systems, e.g., to remove greenhouse gases, and containing water, the processing liquid, components having higher and lower boiling points than water and a component less volatile than the processing liquid, wherein the feed mixture is heated and introduced into a first separation zone, a portion of the water and the processing liquid being volatilized to produce a hot vapor stream comprising volatilized water and processing liquid. There is also produced a first residuum stream which contains some of the less volatile components and the unvolatilized portion of the water in the processing liquid. The hot vapor stream is introduced into the separation system forming part of a gas purification system. The majority of the energy in the hot vapor stream is recovered for use in the separation system forming part of the gas purification system. A substantially degassed processing liquid stream is recovered from the separation system forming part of the gas purification system. There is also recovered, from the separation system forming part of the gas purification system, the feed stream to the first separation zone.

7 Claims, 2 Drawing Sheets

(56) References Cited

U.S. PATENT DOCUMENTS

| | | | |
|---|---|---|---|
| 4,160,810 A | 7/1979 | Benson | |
| 4,617,038 A * | 10/1986 | Mehra | 62/635 |
| 2006/0196357 A1 * | 9/2006 | Menzel | 95/235 |
| 2011/0092355 A1 * | 4/2011 | Iijima et al. | 502/55 |
| 2013/0036911 A1 * | 2/2013 | Mak | 95/161 |

\* cited by examiner

PROCESS FOR RECOVERY OF PROCESSING LIQUIDS

CROSS REFERENCE TO RELATED APPLICATION

This application claims priority to U.S. Provisional Application Ser. No. 61/376,431 filed on Aug. 24, 2010, the disclosure of which is incorporated herein by reference for all purposes.

BACKGROUND OF THE INVENTION

1. Field of the Invention

The present invention relates to a process for recovering a processing liquid and, more particularly, to a process which minimizes energy requirements and capital expenditures.

2. Description of the Prior Art

There are numerous industrial processes wherein a liquid, hereinafter referred to as a processing liquid, which can comprise one or more components, is used in such a fashion that it becomes contaminated with, or contains, various components, some of which are more volatile than the processing liquid and some of which are less volatile and can be dissolved in the processing liquid. Usually, the components in the processing liquid are contaminants, although they may be desirable recovered components, depending on the process in which the processing liquid is used. In such cases, it is almost universally desirable to separate the processing liquid from the less volatile and more volatile components so that the processing liquid can be reused in the process or simply recovered in a substantially pure state for reuse or other uses.

Numerous examples of the above described general scheme of using a processing liquid abound. For example, it is well known that natural gas produced from oil and gas wells, in addition to containing gaseous hydrocarbons, such as methane, ethane, etc., almost invariably contains water and acidic gases, such as $CO_2$ and $H_2S$. In cases where the natural gas contains water, it is very common for so-called gas hydrates or clathrate hydrates to form. These clathrate hydrates are crystalline compounds that occur when water forms a cage-like structure around guest molecules, particularly gaseous molecules.

While the phenomena can occur in any system wherein there is water and gaseous compounds, e.g., hydrocarbons, the problem, at times, becomes especially acute in the petroleum industry, not only with respect to the production of gaseous hydrocarbons such as natural gas, but also in the transporting and processing of natural gas. As noted, typical gas hydrates formed in petroleum (hydrocarbon) environments are composed of water and one or more guest molecules, such as methane, ethane, propane, isobutane, nitrogen, carbon dioxide, and hydrogen sulfide. However, it is also known that other guest molecules such as nitrous oxide, acetylene, vinyl chloride, ethyl bromide, oxygen, etc., can form clathrate hydrates.

With particular reference to natural gas systems and by example only, when gas hydrate crystals form, they can become a nuisance at least and pose a serious problem at worst. Gas hydrates can block transmission lines and plug blowout preventers, jeopardize the foundations of deep water platforms and pipelines, collapse tubing and casing, and foul process equipment, such as heat exchangers, compressors, separators, and expanders. To overcome these problems, several approaches are possible in principal: removal of free water, maintaining an elevated temperature and/or reduced pressure, or the addition of freezing point depressants. As a practical matter, the last mentioned measure, i.e., adding freezing point depressants, has been most frequently applied. Thus, lower alcohols, such as methanol, ethanol, etc., and glycols have been added to act as antifreezes.

While processing liquids such as alcohols and glycols used in natural gas production, transportation, and processing are effective at reducing gas hydrate formation, their use is not without problems. As is well known, the production of natural gas is frequently accompanied by the production of brine, containing sodium chloride and other water-soluble salts. While these halides, such as the alkali metal halides, are readily soluble in water, they also exhibit substantial solubility in the alcohols and glycols used to prevent gas hydrate formation. Accordingly, the processing liquid—in this case the alcohol, glycol, or the like—becomes contaminated with dissolved salts present in the produced water, as well as with certain gases, which, depending on the particular gas, are soluble in the processing liquid. Thus, this presents a specific example where a processing liquid has been used, in this case to prevent hydrate formation, and has now become contaminated with a more volatile component and a less volatile, and in this case dissolved, component.

Again, using the example of natural gas production, transportation, and processing, it is necessary that the natural gas be freed of acidic components, such as $CO_2$, $H_2S$, sulfur oxides, etc., some of which are quite toxic, all of which can lead to severe corrosion problems and in certain cases the formation of unwanted by-products. It is common to scrub the natural gas stream with processing liquids such as liquid amines, particularly alkanolamines such as monoethanolamine (MEA); diethanolamine (DEA); methyldiethanolamine (MDEA), proprietary blends of additives and alkanolamines, as well as glycols such as mono-, di-, or tri-ethylene glycol and non-aqueous heat transfer fluids. Since scrubbing of natural gas to remove acidic gases is normally conducted on natural gas streams that have been substantially freed of water, the dissolved salt content of the natural gas stream from the gas stream is generally quite small. However, even though the ingress of dissolved salt is low from the natural gas stream, continuous use of the amine process liquid for acid gas removal tends to cause the amine to break down with contaminants and create heat-stable, unregenerable salts. If the residual buildup of heat-stable salts (HSS) is permitted to build to typical levels in excess of 1% by weight, the amine performance will decline, corrosion increases rapidly with a decline in pH, and the amine solution begins to foam, creating excessive process liquid losses. Accordingly, the processing liquid, e.g., the alkanolamine, will generally contain dissolved, less volatile components at a much smaller concentration than in the case of an alcohol or glycol used to prevent gas hydrate formation. Nonetheless, even in this instance, the processing liquid now presents a case where, after use, it contains more volatile components, e.g., $CO_2$, $H_2S$, etc., and perhaps a small amount of less volatile and dissolved component.

In the case where treatment of the natural gas to prevent gas hydrate formation and/or remove acidic gases is conducted on offshore platforms, several problems are encountered. For one, the alcohols, glycols, and alkanolamines can be toxic to marine life and accordingly, once spent, e.g., saturated with contaminants that they are being used to remove, cannot be discharged overboard. Aside from ecological concerns, such a method is economically not feasible since it requires a constant replenishment of the processing liquid. Indeed, such a process would not be economically feasible in land-based refineries, chemical plants, or the like.

An evolving area for using alkanolamines as well as proprietary blends of alkanolamines, amines and additives is in greenhouse gas emission abatement from utility vent and flue gas streams—collectively called exhaust gas streams—associated with refineries, gas plants as well as thermal energy production facilities. Depending on the type of fuel used, for example, natural gas, residue coke, bunker oil, heavy oil fractions, all grades of coal, etc., the resulting exhaust gas stream can contain a wide variety of contaminants. These contaminants may include acid gases and solids that differ from those found in natural gas; by way of example, sulphur oxides, nitrogen oxides, carbon dioxide, particulate matter and others that can be created when the aforementioned contaminants react with the processing liquid to degrade the processing liquid into organic byproducts that have reduced gas treating capacity and that may also contribute to processing solution corrosivity. The contact between the exhaust gas stream and the processing liquid results in these contaminants being removed from the exhaust gas stream along with the target greenhouse gases, such as carbon dioxide. Over a relatively short period of time the buildup of these contaminants results in a decline in greenhouse gas removal efficiency and would render the processing liquid unusable if these contaminants were not removed or at least reduced sufficiently as to not interfere with the ability of the processing liquid to capture greenhouse gases within the exhaust gas stream. Plant metallurgy would also be in jeopardy if the corrosivity of the processing liquid is not kept relatively benign. To maintain optimal removal of these greenhouse gases and prevent accelerated corrosion, the processing liquid must have these contaminants removed on a regular basis and ideally on a continual basis.

A secondary artifact of the processes being used for greenhouse gas removal is that, in addition to the contaminants being captured along with the greenhouse gases, the cyclic process being used only partially removes the greenhouse gases from the regenerated processing liquid prior to it being cooled and sent back to the front of the process to remove more greenhouse gases and by their very presence, more of the associated contaminants. Any contaminant removal method considered has to deal with this high concentration of greenhouse gases remaining in the process solvent requiring reclaiming.

U.S. Pat. Nos. 5,152,887; 5,158,649; 5,389,208; and 5,441,605, all of which are incorporated herein by reference for all purposes, all deal with processes and apparatus for reclaiming and/or concentrating waste aqueous solutions of gas treating chemicals. Additionally, U.S. Pat. Nos. 4,315,815, and 4,770,747, both of which are herein incorporated by reference for all purposes, likewise deal with processes for reclaiming or recovering gas-treating liquids. U.S. Pat. No. 5,389,208 discloses and claims a method for reclaiming an impurity-containing waste aqueous solution of a gas-treating chemical that basically involves vacuum distillation of the spent material under temperature conditions that prevent decomposition of the gas-treating chemical and in such a fashion that the process can be operated in apparatuses made of carbon steel, as opposed to more exotic materials of construction, without causing substantial corrosion of the apparatus.

In U.S. Pat. No. 5,993,608 and U.S. Pat. No. 6,508,916, both incorporated herein by reference for all purposes, disclose and claim processes for recovering processing liquids wherein components less volatile than the processing liquid such as dissolved and/or suspended solids are removed from the processing liquid under conditions that prevent any substantial degradation of the processing liquid and provide for the recycle water, refined processing liquid or a mixture thereof back to the front end of the process.

It will be appreciated that the processing liquid is generally expensive and furthermore cannot generally be disposed of in an environmentally suitable manner. Accordingly, the goal of all processes to recover or clean used processing liquids is to render the cleaned processing liquid suitable for further use in the process from which it came. In many processes, the cleaned processing liquid is sent to storage or surge tanks from which it is removed for reuse in a gas processing facility. These processes do not make optimal use of available energy required for cleaning used processing fluid.

SUMMARY OF THE INVENTION

It is therefore an object of the present invention to provide a more energy efficient process for separating a processing liquid from more volatile and less volatile components contained in the processing liquid.

Another object of the present invention is to provide a process for recovering a processing liquid used in the scrubbing of gas streams, some of which contain greenhouse gases.

The above and other objects of the present invention will become apparent from the drawings, the description given herein, and the appended claims.

DESCRIPTION OF THE PREFERRED EMBODIMENTS

Figure 1:
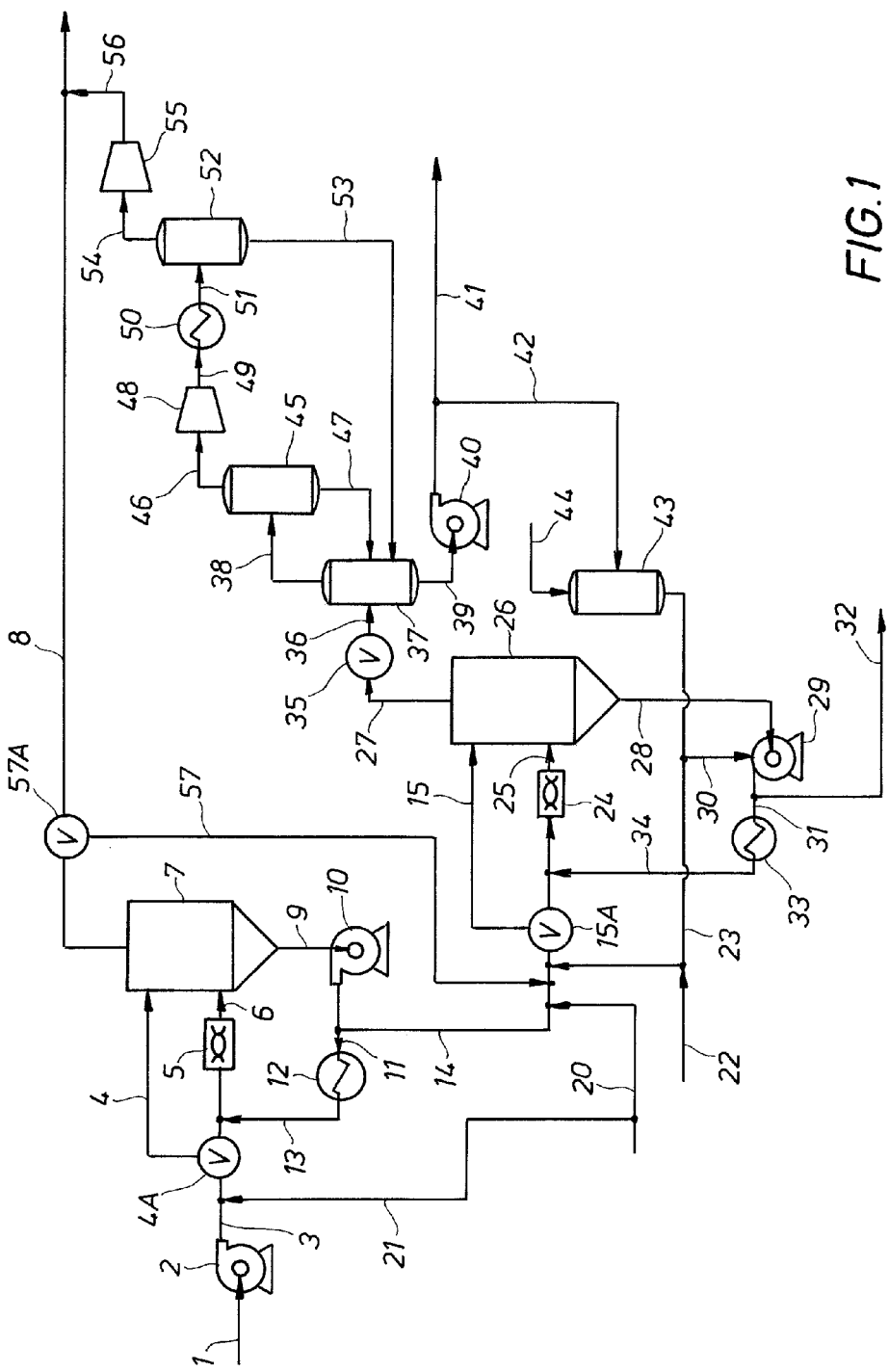
FIG. 1 is a schematic, flow diagram of one embodiment of the process of the present invention.

The term "processing liquid" as used herein refers to any aqueous or non-aqueous liquid that can contain one or more components and includes, without limitation, gas treating chemicals such as alkanolamines, e.g., monoethanolamine (MEA), diethanolamine (DEA), methyldiethanolamine (MDEA), proprietary blends of additives and alkanolamines; or glycols such as monoethylene glycol (MEG), diethylene glycol (DEG), triethylene glycol (TEG), tetraethylene glycol (TTEG), and propylene glycol (PEG), as well as halogenated solvents, liquid hydrocarbons including aromatic compounds, olefinic compounds, aliphatic compounds, water, and mixtures of water and other water-miscible materials, etc. Further, a processing liquid as used herein refers to a liquid that is used in a particular process such that it becomes contaminated with, or at least after use contains, components not normally present in the processing liquid. Thus, the processing liquid can be a gas scrubbing medium used to remove undesirable contaminants from gas streams, a selective solvent to recover desirable components from gaseous or liquid streams, a medium used to treat solids to selectively remove certain components of the solids, etc. Accordingly, while in the examples given herein the invention will be described with reference to the scrubbing of gas streams, particularly greenhouse gas streams, it will be understood that the invention is not so limited.

In cases where the processing liquid is used in greenhouse gas operations, non-limiting examples of contaminants or components that may be present in the processing liquid and that need to be removed include acid gases such as carbon dioxide, sulfur oxides, nitrogen oxides, combustion by-product particulates and more volatile liquid components such as water, etc. Non-limiting examples of less volatile components or contaminants present in the processing liquid that need to be removed therefrom include particulates, inorganic salts such as alkali metal halides; iron salts; salts of organic acids; carbonates; and numerous other organic and inorganic components that are less volatile than the processing liquid and that are dissolved in the process liquid or that are present in generally non-filterable form, e.g., colloidal suspensions. While generally speaking the less volatile component will be a dissolved and/or suspended solid, the latter being generally non-filterable, it is to be understood that the less volatile component can comprise a liquid that is higher boiling than the processing liquid and that, because it is a liquid, would not normally cause fouling or solid buildup in the lines of the process but that, under certain conditions, can form solids or emulsions and therefore must be removed from the processing liquid. Further, such high boiling liquids may affect the operating efficiency and corrosivity of the processing liquid and therefore must be removed or at least have their concentration reduced in the processing liquid to maintain overall processing liquid performance efficiency.

As used herein, the term "feed mixture" includes water, a processing liquid having a higher boiling point than water, and optionally at least one additional component more volatile than the processing liquid and at least one less volatile component than the processing liquid, the concentration of such more or less volatile components being dependent upon the nature of the processing liquid, the type of processing in which the processing liquid is used, and other such factors well known to those skilled in the art. Thus, the feed mixture, as used in the description that follows, refers to the material that is to be treated in accordance with the process of the present invention to reduce or substantially eliminate the more volatile components from the feed mixture and substantially reduce, if not eliminate, the less volatile components from the feed mixture.

As indicated above, depending upon which processing liquid is being used and the conditions under which it is being used, it will contain more or less of the less volatile component, i.e., the dissolved and/or suspended component. In cases where the less volatile component is present in relatively small amounts, e.g., from about 10 ppm to about 10,000 ppm by weight of the feed mixture, and depending on the particular processing liquid employed, reduction of the concentration of the less volatile component can generally be accomplished by purge, e.g. a blowdown stream in the process. Alternately, when the less volatile components in the feed mixture are present in higher amounts, e.g., from about 1 to about 40% by weight, and again depending on the particular processing liquid employed, other steps may be necessary to reduce the concentration of the less volatile component in the processing liquid to maximize recovery of the processing liquid. For example, a solids-liquid separation step can be employed with the separated liquid being recycled to the first separation zone.

With reference then to FIG. 1, a feed mixture, such as, for example, an alkanolamine such as MEA, that has been used to remove acidic gases from a greenhouse gas stream and that contains acidic gases, water, MEA (the processing liquid), and less volatile components, e.g., dissolved or suspended solids, high boiling liquids, etc., is introduced via line 1 from a gas processing facility through transfer pump 2 to line 3. The feed mixture can be directed to the first separation zone formed by a still or flash vessel 7 directly via line 4 where the feed mixture will be mixed with the first heated residuum recycle stream introduced to the still or flash vessel 7 via line 13, through the line or flow mixer 5 and line 6 and any necessary chemical additives via line 21. Alternately, the feed mixture can be directed via line 3 through a flow or line mixer 5, where it is mixed with the heated first residuum recycle stream and any necessary chemical additives, described more fully hereafter, introduced into mixer 5 via lines 13, and 21. Chemical additives may include but not be limited to anti-foaming agents, pH adjustment chemicals, corrosion inhibitors, flocculating agents, etc.

Line or flow mixers are employed since it is preferable to operate the process in a continuous manner. Typical of such mixers are jet mixers, injectors, orifices and mixing nozzles, centrifugal pumps, and agitated line mixers. It will be appreciated that while line or flow mixers are preferred, in certain cases, if holding time is desired, agitated vessels may be employed. The mixture of the first heated residuum recycle stream and, if so directed, the feed mixture from line 1, after being thoroughly mixed in mixer 5, is introduced via line 6 into a first separation zone formed by a still or flash vessel 7. As explained hereafter, heat necessary to effect separation in the first separation zone is imparted to the feed mixture by heat transfer from the heated first residuum recycle stream from line 13 to the feed mixture entering mixer 5 from line 1 or in the still or flash vessel 7 where the first heated residuum recycle stream entering from line 6 contacts the feed mixture entering the still or flash vessel 7 from line 4. It will be appreciated that the first separation zone in still or flash vessel 7 includes a lower, substantially liquid phase zone and an upper, substantially vapour phase zone, an interface being formed between the two zones. It can be further appreciated that depending on the operating conditions desired, the feed mixture can be simultaneously directed through line 4 to still 7 and through line 3, mixer 5, and line 6 to still 7. Such simultaneous flow conditions can be utilized to adjust temperature profiles in still 7, modify fluid levels in still 7 and increase feed mixture rates to still 7.

As will be seen hereafter, the present invention also provides a process which can be integrated with a greenhouse gas capture facility and which results in the recovery of from 80% to about 95% of the energy used to effect vapor volatilization of the processing liquid used in such a facility.

Returning then to FIG. 1, an overhead stream comprising primarily processing liquid and gaseous components, rather than being sent to a storage or surge tank, is transferred directly to a greenhouse gas processing facility, indicated generally as 58 and described more fully hereafter.

With continued reference then to FIG. 1, the first residuum exiting pump 10 can be directed via line 11 to heater 12 and exit as the first heated residuum stream which is recycled to still 7, or a portion of the first residuum can be directed via line 14, mixer 24, and line 25, or directly via line 15, to a second separation zone formed by a still or flash vessel 26. The percent of first residuum feeding still 26 versus being recycled as the first heated residuum to still 7 is preferred to be less than 20% of the first residuum flow rate, more preferred to be less than 10% of the first residuum flow rate, and most preferred to be 5% or less of the first residuum flow rate. Those skilled in the art will appreciate that actual contaminant levels in the first residuum stream in line 11 will dictate the actual proportion of first residuum diverted to the second separation zone, formed by still 26 via line 14, mixer 24, and line 25, or line 15 directly, relative to the flow directed to heater 12.

The first residuum having higher contaminant concentrations such as proportionately more of the less volatile components, e.g., dissolved or suspended solids, high boiling liquids, etc., less of the more volatile components, e.g. water, acid gases, etc., becomes the feed mixture where it is mixed with one or more recycle streams, described more fully hereafter, introduced into mixer 24 via lines 22, 23, and 30 to still 26 via line 14, mixer 24, and line 25, or line 15 directly. The same arguments relative to line or flow mixers, mixing devices and agitated residence tanks are applicable here as previously described.

The first residuum feed mixture in line 14 can be directed to the second separation zone formed by a still or flash vessel 26 directly via line 15 where the feed mixture will be mixed with the second heated residuum recycle stream introduced to the still or flash vessel 26 via line 34, through the line or flow mixer 24 and line 25 and any necessary chemical additives via line 20. Alternately, the feed mixture can be directed via line 14 through a flow or line mixer 24, where it is mixed with the heated first residuum recycle stream and any necessary chemical additives, described more fully hereafter, introduced into mixer 5 via lines 13, and 21. Chemical additives may include but not be limited to antifoaming agents, pH adjustment chemicals, corrosion inhibitors, flocculating agents, etc.

The mixture of the second heated residuum recycle stream and, if so directed, the feed mixture from line 14, after being thoroughly mixed in mixer 24, is introduced via line 25 into a second separation zone formed by a still or flash vessel 26. As explained hereafter, heat necessary to effect separation in the second separation zone is imparted to the first residuum feed mixture by heat transfer from the heated second residuum recycle stream from line 34 to the feed mixture entering mixer 24 from line 14 or in the still or flash vessel 26 where the second heated residuum recycle stream entering from line 25 contacts the feed mixture entering the still or flash vessel 26 from line 15. It will be appreciated that the second separation zone in still or flash vessel 26 includes a lower, substantially liquid phase zone and an upper, substantially vapour phase zone, an interface being formed between the two zones. It can be further appreciated that depending on the operating conditions desired, the first residuum feed mixture can be simultaneously directed through line 15 via 3 way valve 15A to still 26 and through line 14, mixer 24, and line 25 to still 26. Such simultaneous flow conditions can be utilized to adjust temperature profiles in still 26, modify fluid levels in still 26 and increase feed mixture rates to still 26.

In the embodiment shown in FIG. 1, the second separation zone in still 26 is maintained under a vacuum by means of a vacuum pump such as compressor 48, forming part of a downstream, third separation zone. In the process described in U.S. Pat. No. 5,993,608 and U.S. Pat. No. 6,508,916, vacuum conditions ranging from 5 inches of mercury to 16 inches of mercury were employed to effect separation of purified processing liquid from the contaminants without degrading the processing liquid. Ultimate discharge conditions desired in line 49 will dictate which vacuum condition is set in line 46. In any event, vapour or gases flashed from the heated feed mixture in still 26 pass overhead via line 27 to a condenser 35 and thence via line 36 into a gas/liquid separator 37, e.g., a gravity separator allowing sufficient stilling time to effect gas/liquid separation. Light, non-condensables are removed from separator 37 via line 38 to a second gas/liquid separator with the same separation capabilities as separator 37, and via line 46 to compressor 48 and are sent via line 49 to a second condenser 50 and thence via line 51 to a third gas/liquid separator 52 with the same separation capabilities as separator 45, and are fed into compressor 55 via line 54 and from compressor 55 discharged via line 56 back to the process via line 8 to 58.

It can be appreciated, that depending on how the greenhouse capture facility is being operated and operating conditions of the vessel located in the greenhouse gas capture facility to which the combined vapours in line 8 and line 56 are sent, the pressure at the entry point to this greenhouse gas facility vessel may range from nearly complete vacuum to several Bar absolute, particularly from nearly complete vacuum to 5 Bar. If the pressure in line 8 as it enters the greenhouse gas facility vessel is less than the discharge pressure of compressor 48, that condenser 50, vessel 52, compressor 55 and lines 51, 53, 54, and 56 would be optional and that line 49 would exit directly into line 8 instead. It can be further appreciated, that as fully described in U.S. Pat. No. 5,993,608 and U.S. Pat. No. 6,508,916, that if selective separation and recycle of fluids is desired, the art described therein can be applied to the stream exiting still 26 and the subsequent downstream equipment configuration would be adjusted accordingly. Fluid captured in separator 45, and separator 52, is directed to separator 37 via line 47 and line 53, respectively. The contents of separator 37 is the recovered and purified processing liquid, which leaves separator 37 via line 39 to pump 40 for return to the gas processing facility for reuse through line 41, or some or all can be directed from line 41 via line 42 to vessel 43 for recycling and/or mixing with the first residuum feed mixture in line 14 or to pump 29 via line 30 to be mixed with the second residuum exiting still 26 via line 28 prior to entering heater 33 via line 31. Suitable gas pressure, including but not limited to nitrogen and natural gas, provided via line 44 to vessel 43 will provide the energy for such fluid transfers into line 23.

The term "purified" as applied to the processing liquid in line 41 means that the processing liquid has been freed of most of lower boiling components and the bulk of the heavier boiling components and dissolved and/or suspended solids.

An alternate configuration would utilize a pump, not illustrated on FIG. 1, on the exit line 23 to move the fluids to their respective delivery points as described above. This recycle option can be utilized to adjust temperature profiles in still 26, modify fluid levels in still 26, direct off specification processing liquid back to still 26 for reprocessing, provide line flushing and exchanger cooling in shut down situations and dilute the first residuum feed mixture going to still 26, etc. Alternate adjustments in the first residuum feed mixture in line 14 can also be made by directing a small amount of the stream exiting still 7 via line 8 through line 57 via valve 57A to line 14. Provision is also made to add fluids, be they steam, processing liquid from an alternate supply source, etc. to line 14 via line 22. It can be appreciated that actual operating conditions will dictate which combination of stream flows and sources thereof will be used.

Both heater 12 and heater 33 can comprise apparatuses well known to those skilled in the art and can include, for example, the heater disclosed in U.S. Pat. No. 5,389,208, comprising a tube bundle that is heated by heat exchange with combustion gases from natural gas or other combustible gases, all as taught in U.S. Pat. No. 5,389,208. While heater 12 and heater 33 can take many forms, it is preferred that the heating zone be of the type whereby residence times can be kept to a minimum to avoid overheating of the first residuum and second residuum and concomitant decomposition of the processing liquid. To this end, recirculation of the first residuum and second residuum through heater 12 and heater 33, respectively is conducted at a flow rate of 10 feet per second or greater, preferably from about 11 to about 16 feet per second. Maintaining these high flow rates through heater 12 and heater 33 minimizes the likelihood that there will be excessive heating of fluid in the film zone adjacent the heat exchanger surfaces, which could cause vapourization and/or degradation of the processing liquid. Furthermore, the high flow rates minimize coking or scaling of the interior heat exchanger surfaces. Lastly, the high flow rate aids, in conjunction with back pressure regulation, discussed more fully hereafter, in preventing vapourization at the heat exchanger surfaces.

Additionally, the circulation rate of the first residuum and the second residuum relative to the feed mixture and the first residuum feed mixture, as discussed previously, is preferred to be maintained at a ratio of between 50-100 residuum recycle rate to 1 to 5 feed mixture addition rate, more preferred to be maintained at a ratio of between 60-90 residuum recycle rate to 1 to 3 feed mixture addition rate and most preferred maintained at a ratio of between 70-80 residuum recycle rate to 0.5 to 1.5 feed mixture addition. Such high residuum recirculation rates relative to feed mixture feed addition ensures that a majority of the less volatile components will be vapourized upon entry to their respective separation zones.

In the embodiment described in FIG. 1, when the feed mixture is subject to heating and vacuum conditions found in still 7, precipitation of any dissolved components and particularly when such less volatile component is a dissolved and/or suspended solid and/or a low volatility liquid, fouling and solids precipitation can be avoided by proper blowdown or purging of the first residuum exiting still 7. In this regard, a blowdown or purge stream of first residuum is removed from still 7 via line 9, through pump 10 to line 11 and out of line 14 and discharged as first residuum feed mixture to still 26 either directly via line 15 or via line 14, mixer 24 and line 25 to still 26. The amount of blowdown or purge via line 14 is preferred to be less than 20% of the first residuum recycle stream flow rate, more preferred to be less than 10% of the first residuum recycle stream flow rate, and most preferred to be 5% or less of the first residuum recycle stream flow rate and will be dependent upon the concentration of any dissolved and/or suspended solids and less volatile liquids in the first residuum, i.e., the liquid phase removed from still 7, which in turn will depend upon the concentration of such less volatile components in the feed mixture from line 1, pump 2 and line 3 and the solubility characteristics of these in the first residuum.

Further to the embodiment described in FIG. 1, when the first residuum feed mixture from line 14 is subject to heating and vacuum conditions found in still 26, precipitation of any dissolved components and particularly when such less volatile component is a dissolved and/or suspended solid and/or a low volatility liquid, fouling and solids precipitation can be avoided by proper blowdown or purging of the second residuum exiting still 26. In this regard, a blowdown or purge stream of second residuum is removed from still 26 via line 28, through pump 29 to line 31 and out of line 32 and discharged as waste. The amount of blowdown or purge via line 32 will be dependent upon the concentration of any dissolved and/or suspended solids in the residuum, i.e., the liquid phase removed from still 26, which in turn will depend upon the concentration of such less volatile component in the first residuum feed mixture diverted from line 11 into line 14 and the solubility characteristics in the second residuum. In any event, by proper control of the amount of blowdown via line 32, the second residuum recycle stream, which is heated in heater 33, can be maintained at near saturation levels without precipitation of any solids. This purge of second residuum, coupled with the high flow rates through heater 33, permits the application of sufficient heat energy into the second residuum recirculating fluid in recycle stream 14 and 15 to supply all of the heat necessary to effect vapourization in the second separation zone in still 26 without permitting precipitation of dissolved solids, which would greatly reduce efficiencies and could render the portion of the residuum being recycled virtually unpumpable. Thus, by using the process of the present invention, as depicted in FIG. 1, it is possible to recover 95% or more of the processing liquid on a continuous basis in the second distillation.

It was observed in U.S. Pat. No. 5,389,208 that flow rate through the recirculating liquid or residue (in this case, the residuum) through the heater tubes should be at least 6 feet per second, and more preferably 7 to 10 feet per second. Indeed, in the case where the heater tubes are of carbon steel, flow velocities in excess of about 10 feet per second are conventionally thought to be highly erosive, and therefore other materials of construction, such as hardened steel alloys or the like, are used. Nonetheless, it was unexpectedly and surprisingly found that flow rates in excess of 10 feet per second and preferably 11 to 16 feet per second through the heater could be achieved even though the heater tubes are made of carbon steel and that little or no erosive effect on the tubes is observed. This unexpected result is believed to be a function of controlling the solids in the recycled residuum by means of the blowdown through line 14 and line 32 respectively, as well as by controlling the flow rate, pressure, and temperature in heaters 12 and 33 respectively. In addition to tubular heaters, spiral path heaters and wide-gap plate and frame heater configurations can be utilized under the previously described flow conditions.

Preferably, back pressure regulation is effected in both residuum recycle loops by means of a flow restriction, which, to the extent possible, provides streamline or viscous flow and minimizes turbulent flow. For example, a suitable flow restriction to effect-back pressure regulation comprises a Venturi flow restriction. Other types of back pressure regulators or flow restrictors that prevent or minimize downstream turbulent flow can be used, as is well known by those skilled in the art and more fully described in U.S. Pat. No. 5,993,608 and U.S. Pat. No. 6,508,916.

It is important that any vapourization of the first residuum and second residuum in the lines connecting still 7 and mixer 5 and still 26 and mixer 24, respectively, be minimized and ideally eliminated. Accordingly, it is preferred that any back pressure regulation be effected as close as reasonably possible to the inlet of mixer 5 and mixer 24 to ensure that no vapourization occurs in of heater 12 and heater 33, but also in the connecting piping between heater 12 and mixer 5 and between heater 33 and mixer 24. Accordingly, the length of connecting piping between heater 12 and mixer 5 and heater 33 and mixer 24 be minimized, which further reduces the likelihood of vapourization and concomitant two-phase flow.

It is apparent that the process of the present invention includes two separate separation zones, i.e., vessels 7 and 26, with vessel 7 operating under near vacuum to several bar absolute pressure as determined by the exit pressure of line 8, and vessel 26 operating at moderate to deep vacuum conditions as determined by vacuum pump 48 and discharge compressor 54. Thus, still 7 is operated at a variable pressure setting ranging from near vacuum to several bar absolute, as determined by the exit pressure of line 8, and mixer 5 may be under near vacuum conditions so back pressure regulation can be effected between heater 12 and mixer 5. However, when under near vacuum conditions and if back pressure regulation is effected between mixer 5 and still 7, mixer 5, is then under positive pressure. Additionally, still 26 is operated under vacuum conditions, as determined by vacuum pump 48 and discharge compressor 54, and mixer 24 is also under vacuum conditions when back pressure regulation is effected between heater 33 and mixer 24. However, when back pressure regulation is effected between mixer 24 and still 26, mixer 24, is then under positive pressure. A similar configuration will be used for streams exiting heater 12.

It will be appreciated that, while not shown in any of the drawings, valves, level controllers, reboiling loops, and other conventional processing equipment can be incorporated in a manner well known to those skilled in the art to optimize the process of the present invention such that the process can be conducted in a continuous fashion with maximum efficiency.

It will thus be seen that the process of the present invention makes it possible to continuously recover processing liquids, whether such liquids contain a relatively small amount of dissolved and/or entrained solids or a relatively large amount of dissolved and/or entrained solids. Indeed, by incorporating purge or blowdown with the high flow rates through heater 12 and heater 33 and back pressure regulation, in the case where the feed mixture contains relatively small amounts of the less volatile, dissolved and/or entrained component, recoveries of the processing liquid of 95% or greater can be achieved.

Likewise, by incorporating solids/liquid separation with back pressure regulation and high fluid flows in heater 12 and heater 33, processing liquid recoveries of 95% or greater can be accomplished from feed mixtures containing substantial amounts of dissolved and/or suspended solids.

Figure 2:
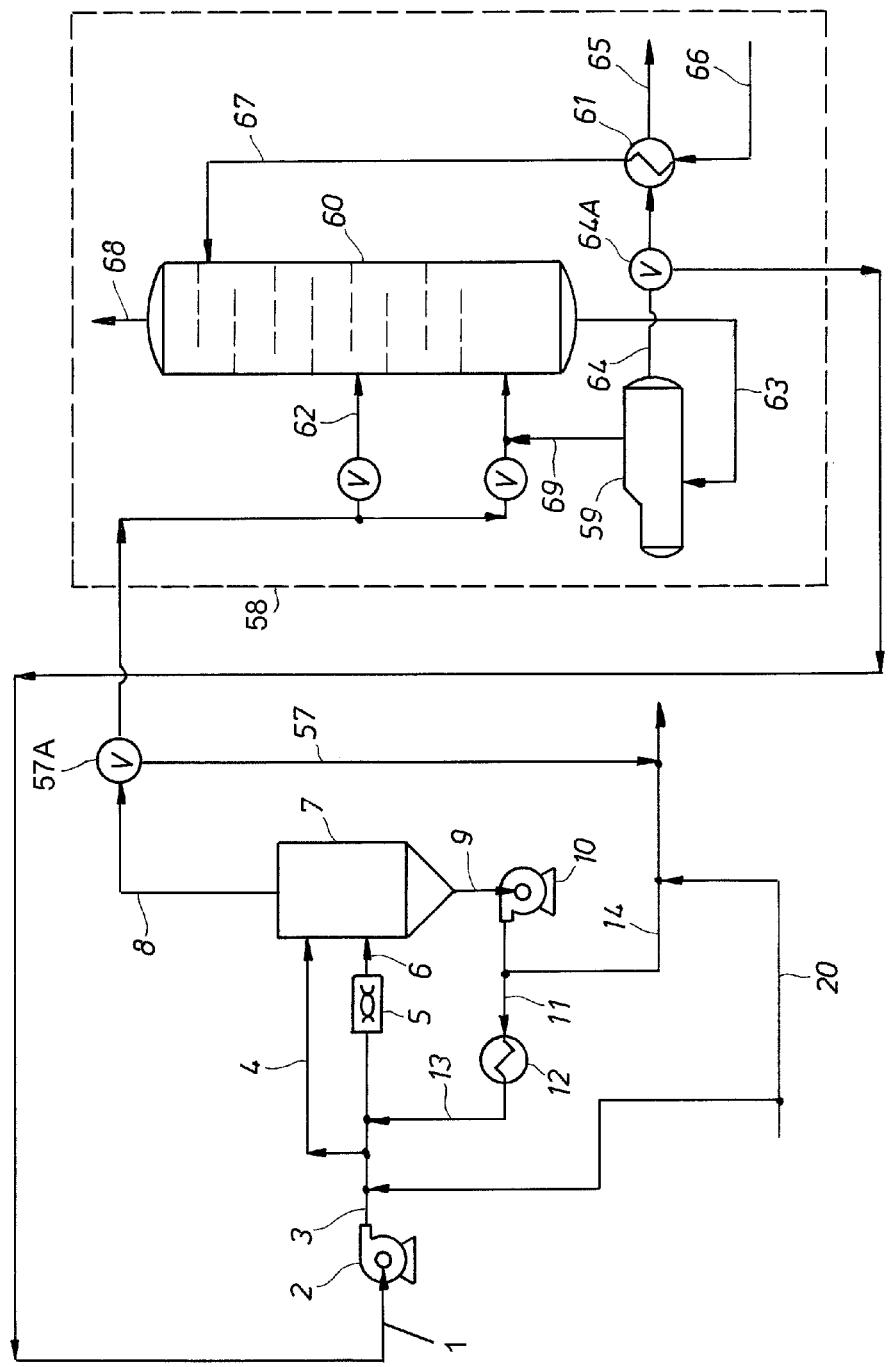
FIG. 2 is a schematic, flow diagram of one embodiment of the process of the present invention.

Referring now to FIG. 2, it can be seen that the overhead or vapor stream from still 7 is introduced into gas scrubbing or processing facility 58 and more specifically is introduced via line 62 into gas processing facility regenerator column which can be trayed or packed and have single or multiple vapor inlets, the latter being shown in FIG. 2. In column 60, $CO_2$, and other noncondensables plus water are taken as an overhead stream via line 68 to further processing, such as condensers, reflux generators, water disposal lines, atmospheric vents, etc. A bottoms stream from column 60 passes via line 63 into reboiler 59, a portion being returned to column 60 via line 69 as hot vapor to effect stripping of acid gases within column 60. A portion of the bottoms stream in reboiler 59 is sent via line 64 to a cross-exchanger 61, which heats spent processing liquid from the gas processing facility via line 66. It will be appreciated that the heated stream in line 67 and in column 60 supplies heat to degas the vapor stream from still 7 via line 68. Additionally, there is additional heat in the form of steam coming from reboiler 59 which, via line 69, is also introduced into column 60 thereby enhancing the amount of heat necessary to separate to the extent possible $CO_2$ and other greenhouse gases.

A cool, rich processing liquid recovered from the gas scrubbing or processing facility, absorber or flash drum, is fed to cross-exchanger 61 via line 66 where it is heated and introduced into the regenerator column 60 via line 67. As seen, a portion of the processing liquid from reboiler 59 can be sent via line 64, valve 64A, and returned via feed line 1 to the process. As was noted earlier, a small amount of the vapor stream exiting still 7 via line 8 can be fed via line 57 and valve 57A to line 14 and subsequently to the second separation zone 26.

In the embodiment shown in FIG. 2, the first separation zone in still 7 is maintained at a pressure condition equal to or slightly higher than the pressure in the vessel located in the greenhouse gas capture facility 58 to which the vapours in line 8 are sent, e.g., column 60. The pressure in still 7 may range from nearly complete vacuum to several Bar absolute and will be dependent on how the greenhouse gas capture facility is being operated. This direct feed back of the first vapours from vessel 7 via line 8 into the gas capture facility at a suitable tie-in point associated with the gas capture facility reboiler or regenerator column 60, and depending on operating conditions, allows the majority and typically about 80% to about 95% of the energy used to effect the first vapour volatilization in vessel 7 to be recovered while at the same time converting the feed mixture to vessel 7 into a first residuum stream that is of higher contaminant concentration. By coupling the vapor stream in line 8 directly to the gas scrubbing or capture facility, not only does the configuration allow maximized energy savings for the overall integrated process but it minimizes the volume of processing liquid that is converted into a first residuum and is removed via line 14.

Minimization of the volume of first residuum exiting via line 14 to subsequent separation zones, as more fully described previously, for final separation of contaminants from the processing liquid and recovery of purified processing liquid for return to the gas capture facility; or to a solids/liquid separation section reduces the amount of processing liquid disposed of and imparts additional energy savings to the process configuration. By reduction in the first residuum via line 14, the physical size of the vessels and associated piping attached to and downstream of line 14 are reduced in size, thereby reducing energy consumption related to their primary manufacture and fabrication into final form and by way of example but not limited to, any energized equipment such as valves, pumps and compressors are also reduced in overall capacity due to the reduction in first residuum, as previously described, being exposed to secondary processing to optimize recovery of the processing liquid contained therein, which in turn uses less electrical energy to operate. Additionally, heat transfer devices associated with the subsequent treating of the first residuum in line 14 are also reduced in physical dimension, so energy saving in their basic manufacture are realized along with the reduced requirement for moving heat transfer medium to and from these equipment thereby further reducing energy consumption associated with conditioning the heat transfer medium, either heating or cooling, as well the energy consumed in pumping the heat transfer fluid to and from the heat transfer devices.

Thus, in addition to energy savings through heat recovery, vessel and transfer equipment sizing for the second separation zone can be reduced with this novel configuration.

A unique difference between the processes currently used and the present invention is that in the prior art processes, the vapor stream in line 8 and its associated heat would have been used as it passed through that part of the process downstream of line 14 thus requiring larger compressors, larger pumps, larger exchangers, etc.

In the present process, the stream in line 8 flashed from vessel 7 passes directly to the customer's facility, i.e., 58. That stream in turn is separated into an overhead stream of $CO_2$, water, other noncondensables, and exits via line 68. The bottoms from the column 60 passes through a reboiler 59, a portion being sent to a cross-exchanger 61. Entering cross-exchanger 61 via line 66 is basically the bottoms stream from a gas absorber/scrubber, not shown, forming part of the gas scrubbing facility. This stream in line 66 is basically spent processing liquid. After being heated in exchanger 61, it passes into tower 60 where light components noted above are separated via line 68 as described above. The bottoms from tower 60, which as noted pass through reboiler 59, ultimately provide the feed stream 1 to vessel 7. In this regard, a portion of the bottoms exiting reboiler 59 passes via line 1 and is the feed stream to vessel 7. The liquid exiting cross-exchanger 61 via line 65 is substantially gas free processing fluid albeit containing solids.

The net result of this process is that rather than using heat energy in the vapor stream in line 8 in the manner discussed above, that energy is now sent to the customer for use in the greenhouse gas capture facility, i.e., to degas the processing liquids. Thus, the energy required in the process upstream of line 56 is minimized as well as the capital costs.

The foregoing description and examples illustrate selected embodiments of the present invention. In light thereof, variations and modifications will be suggested to one skilled in the art, all of which are in the spirit and purview of this invention.

What is claimed is:

1. A process for recovering a processing liquid from a feed mixture recovered from a gas purification system, said feed mixture comprising water, a processing liquid having at least one component having a higher boiling point than water, at least one component having a boiling point lower than water, and at least one component that is less volatile than said processing liquid comprising:

recovering a stream of feed mixture from a separation system forming part of said gas purification system;

heating said first stream of feed mixture;

introducing said heated stream of feed mixture into a first separation zone wherein at least a portion of said water and a portion of the processing liquid is volatilized to produce a hot, vapor stream comprising volatilized water and said volatilized portion of said processing liquid, and a first residuum stream comprising at least some of said less volatile component and the unvolatilized portion of said water and said processing liquid;

introducing said hot vapor stream back into said separation system forming part of said gas purification system;

using heat from said hot vapor stream to heat said separation system forming part of the gas purification system; and recovering a substantially degassed processing liquid stream from said separation system forming part of said gas purification system.

2. The process of claim 1, wherein said first separation zone is operated at a pressure from near vacuum to 5 Bar.

3. The process of claim 1, wherein there is a second separation zone and a portion of said first residuum is sent to said second separation zone.

4. The process of claim 3, wherein a portion of said hot vapor stream is introduced into said second separation zone.

5. The process of claim 3, wherein said second separation zone produces a second zone vapor stream and a second residuum and said second zone vapor stream is sent to a third separation zone.

6. The process of claim 5, wherein a portion of said second residuum is purged to waste.

7. The process of claim 5, wherein said processing liquid is used for $CO_2$ removal.

* * * * *